(12) United States Patent
Libes et al.

(10) Patent No.: US 8,583,632 B2
(45) Date of Patent: Nov. 12, 2013

(54) METHOD AND SYSTEM FOR ACTIVE RANKING OF BROWSER SEARCH ENGINE RESULTS

(75) Inventors: Michael Libes, Bainbridge Island, WA (US); Brian Lent, Bellevue, WA (US)

(73) Assignee: Medio Systems, Inc., Seattle, WA (US)

( * ) Notice: Subject to any disclaimer, the term of this patent is extended or adjusted under 35 U.S.C. 154(b) by 77 days.

(21) Appl. No.: 11/373,020

(22) Filed: Mar. 9, 2006

(65) Prior Publication Data

US 2006/0242129 A1  Oct. 26, 2006

Related U.S. Application Data

(60) Provisional application No. 60/660,489, filed on Mar. 9, 2005, provisional application No. 60/749,720, filed on Dec. 12, 2005.

(51) Int. Cl.
*G06F 17/30* (2006.01)

(52) U.S. Cl.
USPC ............ 707/723; 707/728; 707/730; 707/732

(58) Field of Classification Search
USPC .................. 707/723, 728, 730, 732, E17.109, 707/999.003
See application file for complete search history.

(56) References Cited

U.S. PATENT DOCUMENTS

| | | | | |
|---|---|---|---|---|
| 5,321,833 | A * | 6/1994 | Chang et al. | 1/1 |
| 5,870,740 | A * | 2/1999 | Rose et al. | 707/5 |
| 5,920,859 | A * | 7/1999 | Li | 707/5 |
| 6,012,053 | A * | 1/2000 | Pant et al. | 1/1 |
| 6,526,440 | B1 * | 2/2003 | Bharat | 709/219 |
| 6,714,929 | B1 * | 3/2004 | Micaelian et al. | 1/1 |
| 6,775,664 | B2 * | 8/2004 | Lang et al. | 707/3 |
| 6,829,599 | B2 * | 12/2004 | Chidlovskii | 1/1 |
| 7,333,836 | B2 * | 2/2008 | Soelberg | 455/567 |
| 2002/0087525 | A1 | 7/2002 | Abbott et al. | |
| 2002/0107842 | A1 * | 8/2002 | Biebesheimer et al. | 707/3 |
| 2002/0198875 | A1 * | 12/2002 | Masters | 707/4 |
| 2003/0115187 | A1 * | 6/2003 | Bode et al. | 707/3 |
| 2003/0135582 | A1 * | 7/2003 | Allen et al. | 709/217 |

(Continued)

FOREIGN PATENT DOCUMENTS

| | | |
|---|---|---|
| EP | 1006458 A1 | 6/2000 |
| WO | WO01/67297 A1 | 9/2001 |

OTHER PUBLICATIONS

Kleiman, E., "Combining wireless location services with enterprise ebusiness applications", *Proceedings of MAP Asia Conference*, Aug. 7, 2002, pp. 1-11.

(Continued)

*Primary Examiner* — Ajay Bhatia
*Assistant Examiner* — Randall Burns
(74) *Attorney, Agent, or Firm* — Kilpatrick Townsend & Stockton LLP

(57) ABSTRACT

A computer system and method a computer system and method for processing a search query result includes identifying a plurality of result pages in response to a search query submitted from a computing device directed to a collection of pages, determining a relevancy ranking of the result pages in accordance with a multiple dimension parameter set that includes metrics relating to the search query itself and also includes metrics unique to a subscriber associated with the search query, and providing the result pages in accordance with the determined relevancy ranking. This provides an active ranking process for the search results before they are provided to a user.

36 Claims, 10 Drawing Sheets

(56) References Cited

U.S. PATENT DOCUMENTS

| | | | |
|---|---|---|---|
| 2004/0103087 A1* | 5/2004 | Mukherjee et al. | 707/3 |
| 2004/0128282 A1* | 7/2004 | Kleinberger et al. | 707/3 |
| 2004/0267893 A1* | 12/2004 | Lin | 709/207 |
| 2005/0028156 A1* | 2/2005 | Hammond et al. | 718/100 |
| 2006/0004711 A1* | 1/2006 | Naam | 707/3 |
| 2006/0026147 A1* | 2/2006 | Cone et al. | 707/3 |
| 2006/0031216 A1* | 2/2006 | Semple et al. | 707/4 |
| 2006/0122978 A1* | 6/2006 | Brill et al. | 707/3 |

OTHER PUBLICATIONS

Ma, Wei-Ying, et al. "A Framework for Adaptive Content Delivery in Heterogeneous Network Environments", Internet Citation, Jan. 24, 2000, pp. 1-14.

* cited by examiner

METHOD AND SYSTEM FOR ACTIVE RANKING OF BROWSER SEARCH ENGINE RESULTS

CROSS-REFERENCE TO RELATED APPLICATIONS

This application claims the benefit of U.S. Provisional Application No. 60/660,489 filed Mar. 9, 2005 entitled Search Application for Mobile Content and claims the benefit of U.S. Provisional Application No. 60/749,720 filed Dec. 12, 2005 entitled Mobile Device Advertising Platform. The disclosures of 60/660,489 and 60/749,720 are incorporated herein by reference in their entirety.

BACKGROUND

The present invention relates to content search systems for use with computing devices and, more particularly, to content search systems that rank search engine results.

Computing networks are commonly used in everyday life. The most ubiquitous example of a common computing network is probably the Internet. Millions of users get online to the Internet and retrieve information over the Internet daily, through the use of Internet browser applications that are able to "visit" Internet sites (collectively referred to as the World Wide Web). Most users access the World Wide Web through desktop or laptop computing devices through either wired or wireless network connections. A similar network is available to users with mobile platforms, such as Personal Digital Assistants (PDAs) and Web-enabled mobile telephones, who generally gain access to the Internet through a wireless connection.

One common network activity is to search for Internet sites that have content of interest. Internet sites are collections of "pages" that can be reviewed with appropriate browsers. Search queries can be submitted and pages that are relevant to the search query terms can be returned to a user's browser for viewing. The returned search results comprise a collection of links to pages of relevance to the search query.

Mobile search, however, is different from a typical Web search or Enterprise search. Mobile searches are typically requested by users who subscribe to a mobile Internet or mobile data access service in addition to a mobile (cellular) voice telephone service. Mobile subscribers are not typically performing searches as part of a research task, as is common with a Web search. Moreover, mobile subscribers are typically not searching for specific documents, as is common with Enterprise search (such as with document management systems). Instead, mobile subscribers are typically searching for mobile-centric merchandise, such as ringtones, or they are searching for small summaries of information, such as the latest news, sports score, weather, retail product price comparison or traffic report, or they are searching for services, such as a restaurant, laundry, or vehicle service stations. Some of these searches might also be location-sensitive, with the goal to find the "nearest" search result to the users' present physical location (i.e., "nearest gas station"). In this discussion, "mobile" will be understood to refer to a wide range of mobile computing devices, including "smart" cell telephones, web-enabled telephones, Web-enabled PDAs, and the like, although such devices will be collectively referred to as mobile handsets and will collectively be described in the context of mobile handsets.

Mobile search and PC-based search systems also differ due to the significant user interface limitations on mobile handsets. With rare exceptions, a PC includes a keyboard and 15 inch or larger monitor. A common mobile handset includes only a 12-key keypad, 5-way navigation control, and a 2-inch or 3-inch display. These limitations shorten the average length of search queries for mobile and greatly limit the amount of information which can be conveniently viewed by the searcher.

Furthermore, mobile handsets have on average far less computing power than PC's, far less memory, slower network access, and longer latencies in the communications networks. These limitations further hinder the mobile search experience vs. PC-based search.

Due to these and other differences, mobile search is focused far more on providing direct answers to queries than is typical for Web search or Enterprise search. Providing answers, instead of references (i.e., links) to relevant pages that might contain the answers is a much more computationally and algorithmically difficult problem to solve.

It should be apparent that the mobile user search experience would be improved if search results provided more relevant answers to mobile search queries, presented in an efficient manner. The present invention satisfies this need.

SUMMARY

Embodiments of the invention pertain to a computer system and method for processing a search query result, comprising identifying a plurality of result pages in response to a search query submitted from a computing device directed to a collection of pages, determining a relevancy ranking of the result pages in accordance with a multiple dimension parameter set that includes metrics relating to the search query itself and also includes metrics unique to a subscriber associated with the search query, and providing the result pages in accordance with the determined relevancy ranking. In this way, an active ranking process for the search results before they are provided to a user will produce a more relevant set of responses to the search query for consideration by the user, and are presented in a more efficient manner. This improves the user search experience.

In one aspect in accordance with the invention, the search query metrics for determining the relevancy ranking include data relating to an aggregate popularity of keywords contained in the search query. In another aspect, the subscriber unique metrics include data related to the computing device from which the search query was submitted. The data related to the computing device can include, for example, data relating to rendering capabilities of the computing device, such as display screen resolution, audio playback features, and network bandwidth. The subscriber unique metrics can be identified by association with the computing device, alternatively, the subscriber unique metrics can be retrieved from a database that includes data relating to the subscriber. The data relating to the subscriber can include data relating to past browser actions of the subscriber, and demographics associated with the subscriber.

In another aspect in accordance with the invention, determining a relevancy ranking includes deleting a result page if the determined relevancy ranking of the result page is below a deletion value. In another aspect, determining a relevancy ranking includes associating each result page with a relevancy ranking value and ordering the plurality of result pages in accordance with the associated relevancy ranking values of the result pages. In addition, another aspect, associating each result page is performed for each dimension of the multiple parameter set, and ordering the plurality of result pages comprises resolving respective relevancy rankings of each parameter set.

Other features and advantages of the present invention should be apparent from the following description of the preferred embodiments, which illustrate, by way of example, the principles of the invention.

DETAILED DESCRIPTION

In the following description, for purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form without unnecessary details that are known to those skilled in the art so as to avoid unnecessary details that could obscure understanding of the present invention.

These and other embodiments of the invention along with many of its advantages and features are described in more detail in conjunction with the text below and attached figures.

Figure 1:
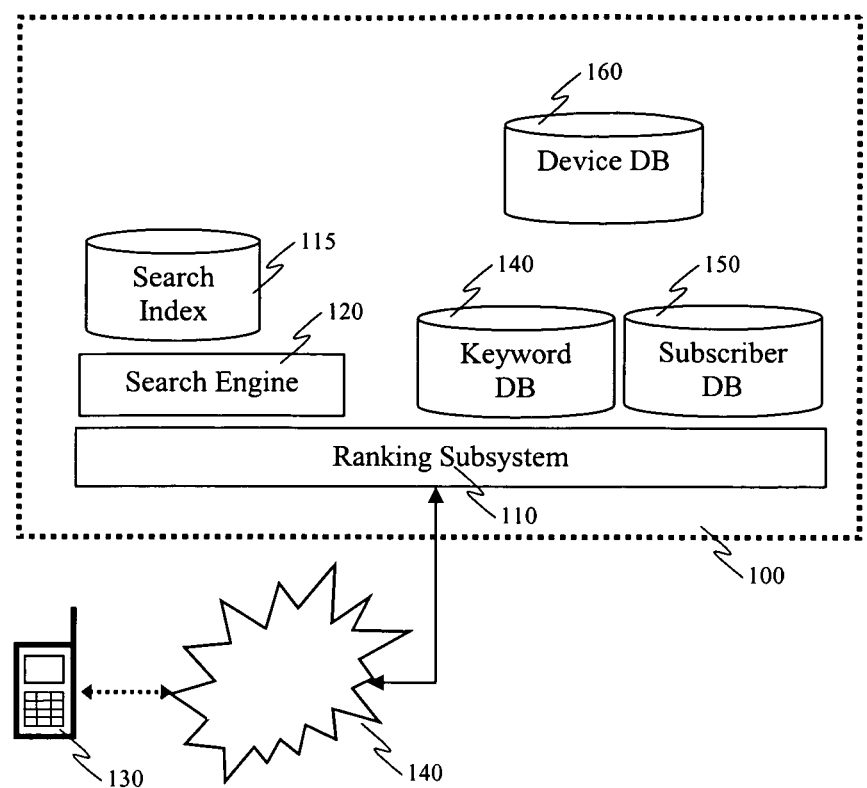
FIG. 1 is a block diagram of a system that supports search results processing in accordance with the invention.

FIG. 1 is a block diagram that depicts a search system 100 wherein a mobile handset computing device 130 communicates with the search system via a network 140. In the FIG. 1 embodiment, the computing device 130 and network 140 are illustrated as communicating via wireless connections, but it should be understood that the teachings of the present invention also have applicability to fixed device networks and to networks that are combinations of fixed (wired) and wireless devices. The search system 100 can comprise a single search system that includes the various components illustrated within the box 100, or the components within the drawing box 100 can be implemented over one or more computers and associated peripheral devices or system components.

The start of processing in accordance with the invention begins when a person enters a search query on a mobile handset 130 or other computing device using a device keypad, voice input, built-in camera, or any number of other means of search query input. The search query is sent from the computing device 130 across the network 140 to the search system 100 where the actual search processing will be performed. The search server includes a search index 115, containing a processed set of searchable items; a search engine 120, containing the methods required to search the search index; and an active ranking subsystem 110, which can order the results generated by the search engine. Three additional databases, a keyword database 140, a subscriber database 150, and a device specific database 160, contain pre-processed information that is used by the active ranking subsystem to re-order the search results.

The techniques and methods for providing the pre-search databases, including the search index 115, the keyword database 140, the subscriber database 150, and the device specific database 160, as well as the techniques and methods for providing the search engine 120, will be well-known to those skilled in the art.

Figure 2:
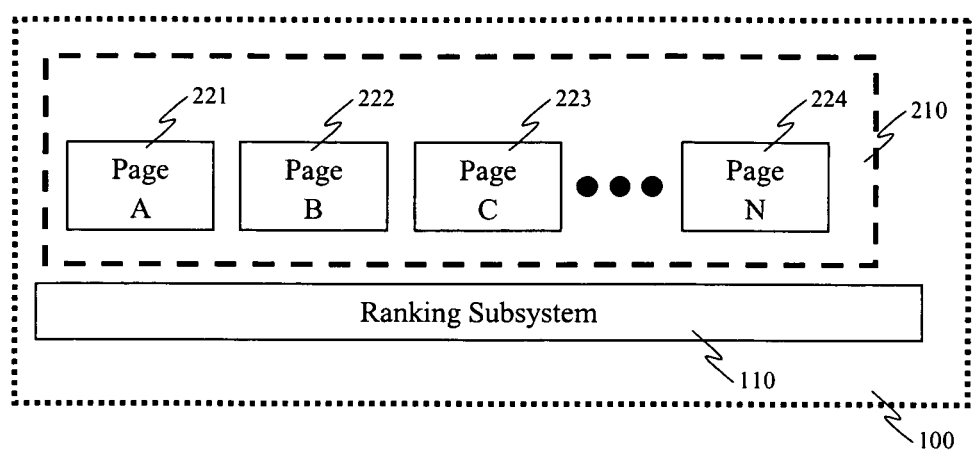
FIG. 2 depicts search results prior to ranking by the system shown in FIG. 1.
Figure 3:
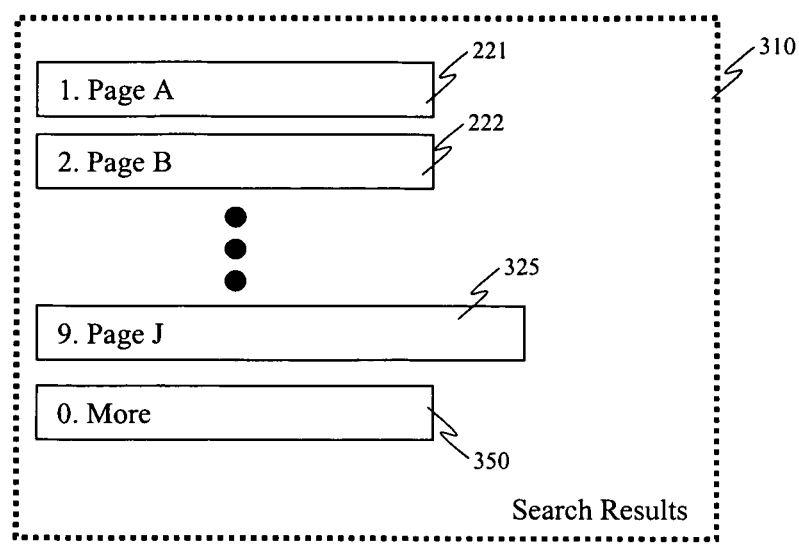
FIG. 3 depicts the search results pages in FIG. 2 after they have been ranked and ordered by the system shown in FIG. 1.

FIGS. 2 and 3 depict the components of a search result. FIG. 2 shows the components within the search results 210 generated by the search engine 120. As shown in FIG. 2, search result can be empty (zero pages, a failed search) or a search result can contain one or more result pages 221, 222, 223, 224 relevant to the search query. In accordance with the invention, the ranking subsystem 110 will re-order the result pages into a relevancy ranking order from most relevant to least relevant. FIG. 3 shows a diagrammatic view of the search results 310 as rendered on the mobile handset computing device 130. One or more of the result pages 221, 222, 325 are rendered in one or more lines of text and/or images on the display of the computing device. For mobile handsets, due to the limitations of the size of the displays on such computing devices, it is only practical to display between five and fifteen labels or titles for such pages on a single rendered page. To navigate to additional result pages, a special display line 350 labeled "More" or "Next" or the like is provided on the display so that the user can select the display line 350 and initiate viewing of the additional pages.

Figure 4:
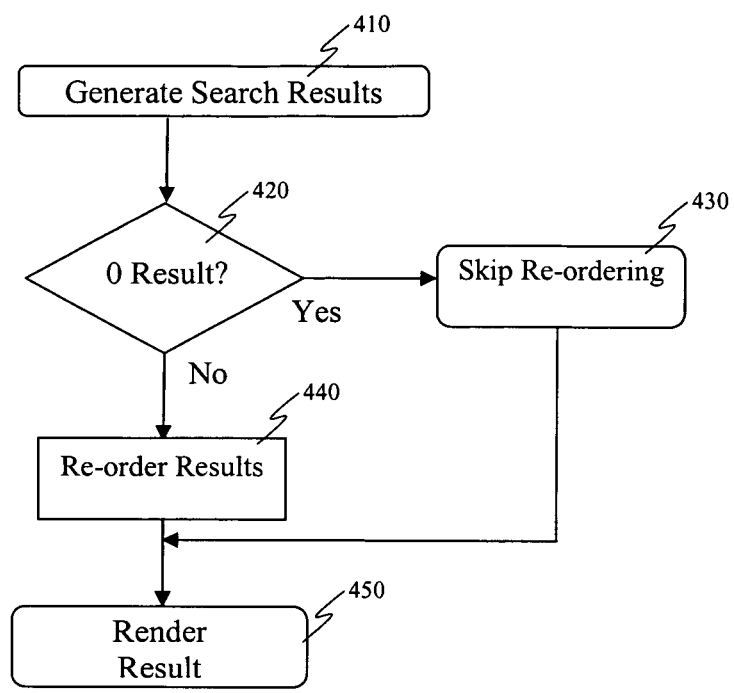
FIG. 4 is a flow diagram that illustrates search results processing in accordance with the FIG. 1 system.

FIG. 4 is a flow diagram with operation boxes that represent the high-level operations of the active ranking system. The operations begin at box 410, when search results are generated by the search engine 120. It is possible, but uncommon, for the search engine to produce no results at all, or to produce a single result (single page). If the search result was zero (failed search) or returned a single page, an affirmative outcome at the decision box 420, then the active ranking system does nothing to the results. That is, as indicated by box 430, the re-ordering is not performed at all upon a failed or single result search. In all other cases, the ranking subsystem re-orders the results at box 440. Finally, at box 450, the ranked and ordered results are rendered to the computing device, in a form such as illustrated in FIG. 3.

Figure 5:
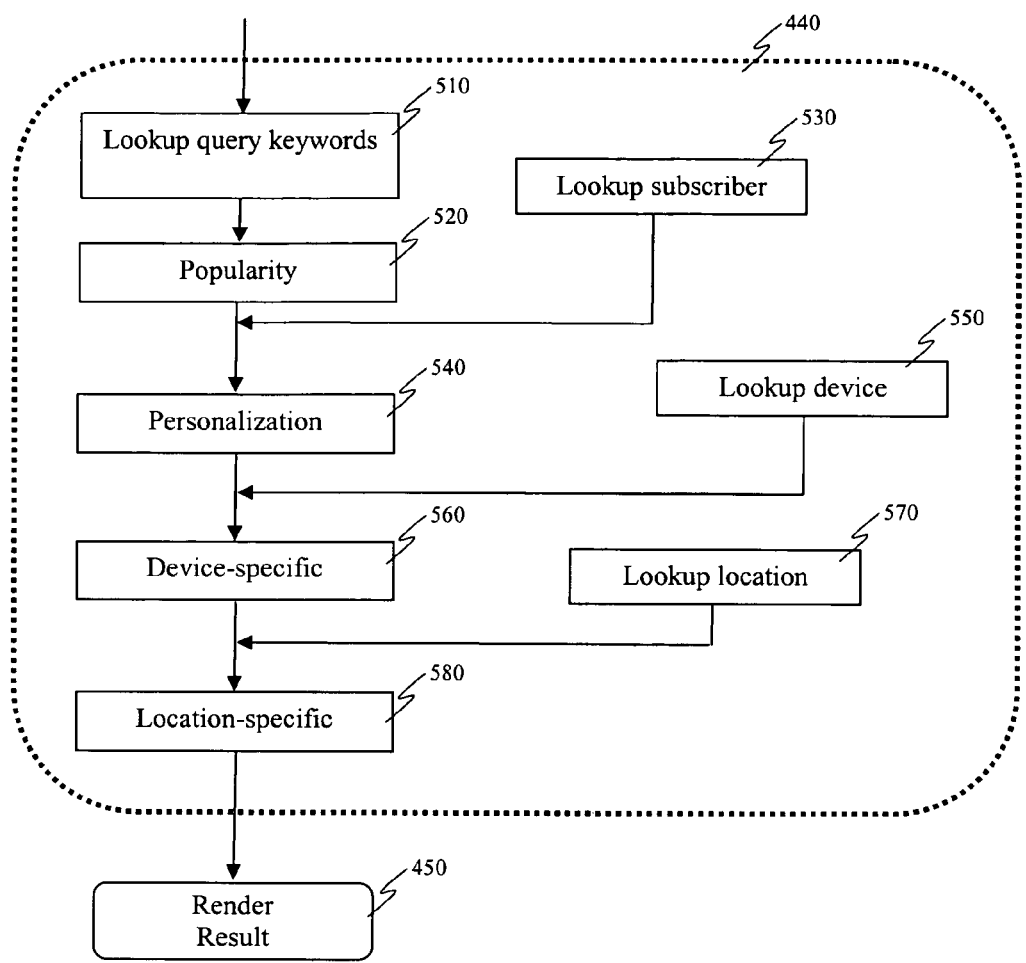
FIG. 5 is a flow diagram that illustrates details of the processing in accordance with the system of FIG. 1.

FIG. 5 is a flow diagram that illustrates details of the operations for the re-ordering operation 440 of FIG. 4. The re-ordering process determines a relevancy ranking of the result pages in accordance with a multiple dimension parameter set that includes metrics relating to the search query itself and also includes metrics unique to a subscriber associated with the search query. In FIG. 5, the re-ordering begins 510 by looking up the keywords in the search query in the pre-processed keyword database 140. These are the metrics relating to the search query itself. The keyword database contains information such as which pages are most often associated with (most popular for) a given keyword. At box 520, this popularity information is used to re-order the search query results based on non-user specific (i.e., aggregate) metrics that are not personal to the user. In addition, the search ranking processing considers metrics unique to a subscriber associated with the search query. For these metrics, as indicated at 530, personal (user-identifiable) data about the subscriber initiating the search query is retrieved from the pre-processed subscriber database 150. This database contains information about the past actions of the subscriber, demographic data about the subscriber, and actions by subscribers with past actions and/or demographics similar to those of the subscriber. The information gathered in 530 is used to determine a relevancy ranking in the context of subscriber information and possibly re-order the results at 540, based on the retrieved personal use data. In box 550, the capabilities of the specific subscriber device (such as, but not limited to, screen resolution, audio ability to play certain types of Ringtones, video capability, processor speed, network bandwidth, and the like) are retrieved from the Device Specific database 160 (FIG. 1). The device information retrieved at 550 is used at 560 to determine a relevancy ranking in the context of device capabilities and possibly re-order the pages based on the capabilities of the specific computing device. In box 570, the physical location (geographic) of the computing device is determined. Those skilled in the art will be aware of techniques for determining device location, including GPS processing and cellular telephone tower triangulation techniques. The device location information determined at 570 is used at 580 to determine relevancy in the context of location and to possibly re-order the pages in accordance with the location of the computing device. At box 450, the result page selected is rendered by the computing device.

The information gathered from the re-ordering at 540 and 560 and 580 can be used in a resolution and re-ordering process that is integrated with the rendering process 450 (or can be performed in a resolution process that is separate and distinct from the rendering processing). Such resolution processing can serve to optimize the re-order of the results based on this combination of data. That is, the ranking processes that process the search results along the multiple dimension parameter sets 510, 520, 540, 560, 580, 450 may each not only re-order the results, but may also remove pages or delete pages that are irrelevant to a keyword or subscriber, or are not technically viewable or consumable by that searchers cellular device based on its capabilities. In one embodiment, a page is assigned a relevancy ranking value and is deemed irrelevant if it is assigned a relevancy ranking value that is below a minimum ranking threshold. It should be understood that the re-ordering operations 510, 520, 540, 560, 580, 450 can be performed in any order, or can be performed simultaneously or in tandem. In any situation, the results of the various parameter set re-orderings can be merged so that a single, optimized ordering of the results can be provided. That is, a resolution of any differences in relevancy ranking between the parameter sets can be performed, such as by the last box 450, or the relevancy ranking operations 510, 520, 540, 560, 580, 450 can be performed serially, one after the other, so that the last performed ranking is the ranking that prevails.

Figure 6:
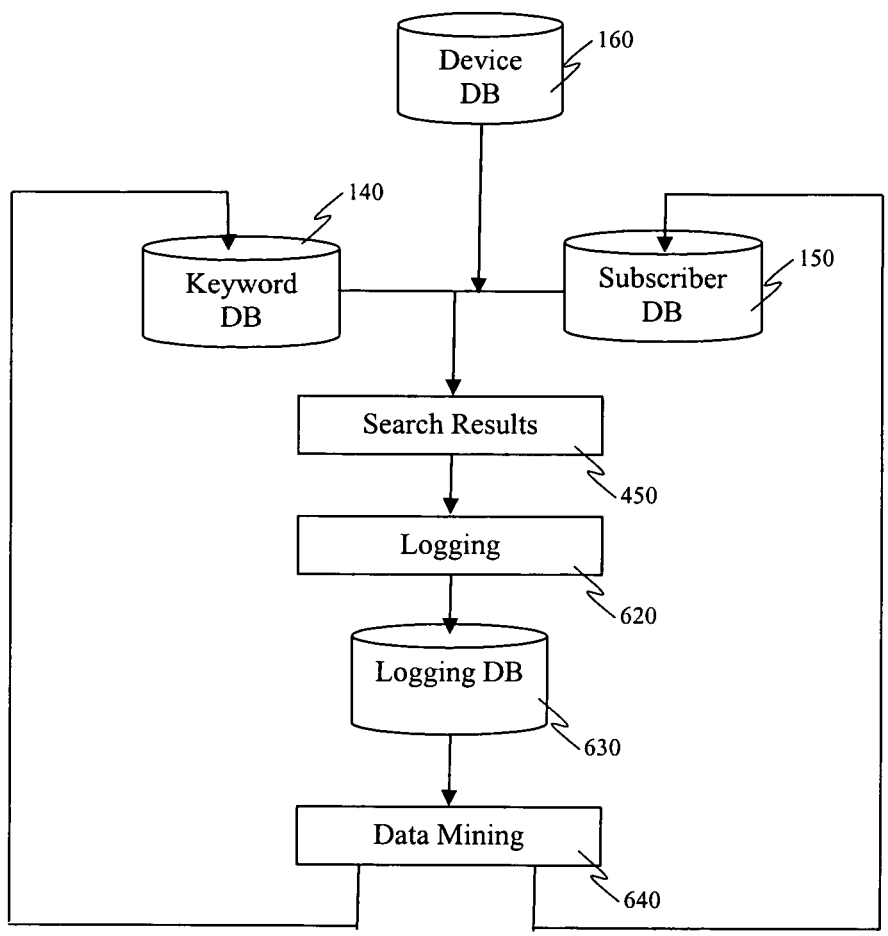
FIG. 6 is a flow diagram that illustrates reordering of results pages by the system of FIG. 1.

FIG. 6 is a flow diagram that represents operations within the search system 100 for populating the keyword database 140 and subscriber database 150 and device database 160. In FIG. 6, the search results are rendered in step 450 (see FIGS. 4 and 5). All activity in selecting those results is logged or recorded at 620 and stored in a Logging database 630. At a later time, the information in the Logging database is processed by data mining methods at 640. The results of these data mining methods are stored in the keyword database 140 and the subscriber database 150 and device database 160. The FIG. 6 operation comprises a feedback loop which incrementally improves the relevancy of the re-order subsystem as additional activity is logged in the logging database 630 for future reference.

The motivation behind the importance and uniqueness of the active ranking technique described herein is that in mobile search the relevancy of the search results should be much more accurate and targeted than in prior searching methodologies, especially those oriented for desktop search. First, the search results need to be in the form of answers to the search queries versus a set of URL links. Second, the search results must fit on a much smaller user interface/screen than with traditional computers. And third, the resulting answers must be actionable from the user's cellular handset (this is in contrast to a personal computer where a common operating system and internet browser exist, and where such standards like HTML exist). For example, if a searched-for Ringtone cannot be technically played back on that user's cellular handset, then there is no reason for it to appear in the search results and hence should optimally be removed and replaced with the next result on the search results list, in order provided by the active ranking search system 100.

In short, the active ranking technique described herein is a "vote", by each of four major ranking subsystems, about how important each search result is to a specific user's search query. In the described embodiment, those four major subsystems are: Keyword match, Personalization, Device specific database, and LBS (location based service) spatial proximity.

Calculation of the Relevancy Ranking

The relevancy ranking value described above is calculated using the relationship defined by the following mathematical relationship:

$$\forall_u AR_k(u) = c \left[ \begin{array}{l} \alpha \sum_i \left( tf_i * \log\left(\frac{D}{df_i}\right) \right) + \\ \beta \sum_{v \in \bigcup u} P(v) + \lambda \sum_{v \in \bigcup u} DSI(v) + \\ \gamma \left( 1 - \sqrt{(u_x - P(V_x))^2 + (u_y - P(V_y))^2} \right) \end{array} \right] + (1 - c)$$

where the terms are defined by the following:
AR=Active Rank matrix (sorted order of vectors)
u=set of total search results
v=set of metadata attributes associated with each search result item
k=a given Active Rank row (value for a specific search result)
c=normalization coefficient≤1
$\alpha$=bias to weight keyword matching effects ($0 \le \alpha \le 1$)
$\beta$=bias to weight Personalization profiles ($0 \le \beta \le 1$)
$\lambda$=bias to weight Device Specificity effects ($0 \le \lambda \le 1$)
$\gamma$=bias to weight LBS geometric distance effects ($0 \le \gamma \le 1$)
$tf_i$=term frequency (keyword counts) or number of times a term i occurs in a search result page
$df_i$=document frequency or number of pages containing term i
D=number of documents in the database
P=Personalization profile vector
DSI=Device Specific Index vector
(ux, uy)=each search result's geocoded location, if any
(vx, vy)=cellular user's actual physical location (stored in vector P) provided by the cellular network The calculation of the ARk(u) term is the actual calculated value of the search result u, and is computed for every search result k in the complete set of results for a specific mobile search query.

The methods used to calculate these equations involved both dynamic and linear programming, and are largely biased to weight certain components based on the administrator-specified, tunable parameters of $\alpha$, $\beta$, $\lambda$, and $\gamma$. This is accomplished via an Administrative Console process. The Administrative Console comprises an interface from which a user, such as an administrative person who initializes an installation of the system, sets up the search engine operation and, if desired, sets up a desired sequence of parameter set processing. As noted above, the parameter set processing can comprise sequential processing or simultaneous (parallel) processing of the ranking operations.

Figure 7:
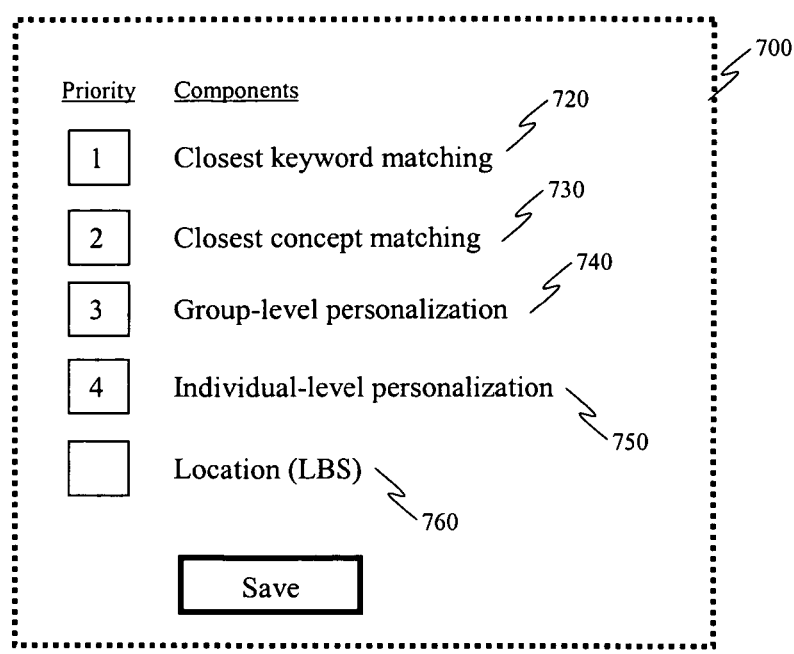
FIG. 7 is a screen shot depicting a GUI for input of administrative preferences in the processing of search results by the system illustrated in FIG. 1.

FIG. 7 is an illustration screenshot of the GUI display that is provided by the Administrative Console in the system 100. The ordering numbers indicated in the boxes of the screenshot indicate a sequential ordering, as specified by the numbers 1, 2, 3, 4, so that "1" is the first performed parameter set, "2" is the next performed, and so forth. If the same value were entered in the boxes of FIG. 7, then parallel processing of the parameter sets would be performed. Thus, in FIG. 7, a "1" in the priority box next to the "Closest keyword matching" line 720 indicates that keyword matching will be performed first. A "2" in the "Concept" line 730 indicates that concept matching is next, while the "3" in the "Group-level personalization" line 740 indicates a group-level personalization priority feature is performed next, and the "4" in the "Individual-level personalization" line 750 indicates that an individual-level personalization priority feature is performed next. A blank priority box in the "Location" line 760 indicates that location will not be considered for the priority processing in this instance. Thus, the Administrative Console display is used to select priority operation in the system.

Figure 8:
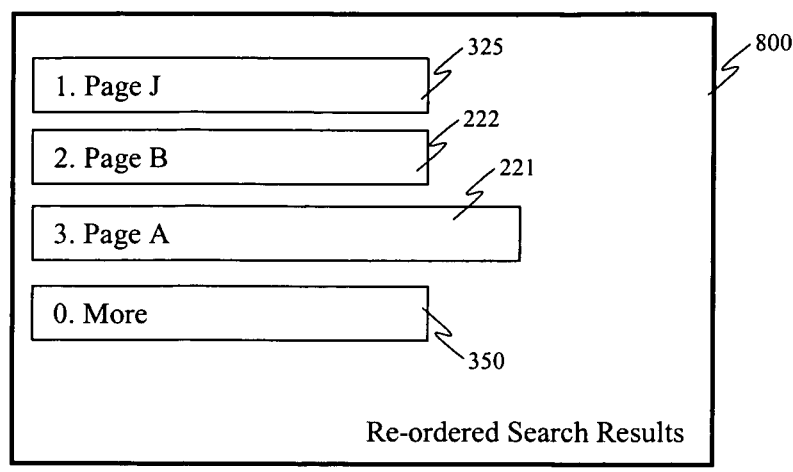
FIG. 8 is a screen shot depicting a GUI for display of results on a user computing device in accordance with processing of the FIG. 1 system.

FIG. 8 is a screen shot 800 depicting a GUI for display of ranked results on a user computing device as ranked and ordered in accordance with the active ranking processing of the FIG. 1 system. The FIG. 8 display is for a mobile computing device, such as a Web-enabled wireless telephone. The FIG. 8 display screen shot 800 is produced after the re-ordering processing described herein is performed on the results displayed for FIG. 3. As described previously, the search results are displayed as a series of page names that may be selected by the user. Because the display 800 is a result of re-ordering search results from FIG. 3 in accordance with the invention, the page names 325, 222, 221 are shown in the re-ordered sequence of Page J 325 followed by Page B 222 followed by Page A 221 (compare FIG. 3). A "More Result Pages" item 850 selects additional result pages. It should be noted that one or more of the pages "C" through "I" from FIG. 3 have been deleted from the listing in FIG. 8. In the context of a mobile device, the page results can be a variety of data objects, including graphical pages, audio clips, multimedia displays, and the like. In the processing of the system 100, each of the pages listed in the display 800 is rendered by the mobile computing device as that page is selected for display (rendering) by the user. Systems incorporated into the mobile computing device attend to proper rendering of the data.

System Description

The system described herein can be implemented in a mobile device advertising platform that provides an advertising solution for the mobile device market-space that is performance based and that provides the user with an enriched browser experience. Such a platform has been developed by the assignee of the present application, Medio Systems Inc. of Seattle, Washington, USA. References to "Medio Systems" or "Medio" shall be understood to refer to the Medio Systems, Inc. mobile device advertising platform. The Medio Systems mobile device advertising platform includes components directed to reporting and analytics, with which advertising performance and effectiveness can be determined.

1.0 Medio Systems Platform and the Market

As noted above, advertising on mobile handsets is a nascent market, but a highly discussed topic in the industry. It is expected that a number of mobile advertising platforms will be launched in 2006. However, based on online advertising trends since the mid-1990s, the methods that the advertising community will ultimately adopt and mobile subscribers will accept will likely not shake out until 2008 or 2009.

These market conditions are analogous to the Web in the mid-1990s. Yahoo, Lycos, and AltaVista originally sold impression-based banner ads of various sizes and placement on their search engines, CNN, C|Net, and others did the same on their content websites; and later resellers like DoubleClick and LinkExchange acted as wholesalers for a variety of smaller sites. Later on came paid-placement (Go2.com, later known as Overture) and click-through ads, and then Google introduced the wildly popular self-service model for advertisers using three-line ads in AdWords, and contextually relevant text ads in AdSense.

The business model of Medio Systems is based on development of a performance-based mobile advertising platform and associated revenue model, and bringing this model to market in co-operation with wireless carriers.

2.0 Mobile Centric Advertisements

Mobile advertisements are vastly different from PC-based Web advertisements due to seven primary factors:

No universal browser
Screen size
Keypad input
Network issues
CPU
Memory
Network cost Combined, these factors have a dramatic effect on the customer experience. The Medio System Advertising Platform, as part of the Medio Systems Search System, makes the most of the mobile environment to provide best-of-class search and advertising.

2.1 Browser

Mobile handsets do not feature a universal browser comparable to the PC's Internet Explorer or Firefox. Instead, a mobile handset may use one of dozens of different browsers, in different versions, each of which uses a different subset of WML, XHTML, and Cascading Style Sheets. This fact means that mobile browser content must follow the same write-once, test-everywhere methodology required by custom-developed applications such as J2ME and BREW.

2.2 Screen Size

While the average PC monitor currently averages about fifteen inches diagonally, most mobile handsets' screens measure between 2 and 2½ inches. Handset screen resolution is typically between 120×120 and 172×220 pixels. While the newest popular handsets provide 240×320 resolution, the actual physical size of the screens remains near 2 inches. This fact limits the amount of information that can be presented on a single screen. Normally a single advertisement, or at most three one-line paid-placements, will fit on a mobile screen without severely impacting the overall customer experience. These screen sizes restrict the presentation of information to one long, scrollable column, because there simply is not space for a left-column navigation pane nor a right column filled with advertisements.

2.3 Keypad Input

The desktop or laptop PC uses a mouse or trackpad and a full QWERTY keyboard for input and navigation. Mobile handsets have standardized on a 12-key numeric telephone keypad, a 5-way navigation control, and 2 softkey buttons. Some phones also include a dedicated "back" or "clear" button, others a third softkey, and many provide a second up/down toggle for adjusting volume. These auxiliary buttons simplify the most common actions, but do not change the customer experience as a QWERTY keyboard would. This restricts the potential navigation options within a single displayed page. Selecting an item at the bottom of a page, for example, is an order of magnitude more cumbersome on a mobile phone than on a PC browser, requiring up to 20 key presses vs. one click of a mouse. Similarly, viewing a piece of information "below the fold" is much more difficult on a mobile screen than pressing Page Down or using a scroll bar on a PC. Scrolling a page to the bottom can require dozens of key presses and can cause frustrated customers to stop using their handset for data services.

2.4 Network Issues

Typical wireless networks include relatively large latencies and relatively low throughput. Even EVDO and UTMS networks include latencies which feel like a long wait to a customer who is accustomed to a broadband PC connection. Research has shown that the more portable a device, the lower all latencies must be to feel like a quick response. On a PC, an application that starts within 5 seconds provides an acceptable experience. On a notebook, returning from standby can take up to 10 seconds before causing frustration. However, on a handheld device, any delay of greater than 100 milliseconds is noticeable. Handsets are panned in reviews if pressing a button does not bring an "immediate" response.

In the near term, wireless networks are not likely to gain enough speed to feel quick and responsive. Despite the promised speeds of 3G networks, the average delivered speeds are still slower and more jitter-prone than the broadband connection that customers are used to at work and at home.

2.5 CPU

Over the past few years, CPU speeds on mobile handsets have improved dramatically in all benchmarks. However, much of that CPU improvement is consumed in powering wireless networks with higher data speeds, driving larger displays, and in driving enhanced user interfaces. The residual CPU capacity continues to increase, but still lags far behind the CPU speeds found on even the cheapest of PCs.

This difference affects a device's apparent speed in scrolling a page, animation frame rates, and ability to simultaneously stream data while the customer interacts with an application. Along with the network capacity, CPU power limits the number of images that can appear on a single page, and more fundamentally, limits the complexity of applications built on mobile handsets.

2.6 Memory

While amount of RAM available on mobile handsets has increased dramatically over the past few years, it is typically still measured in single-digit megabytes, while a typical PC boasts at least a half of a gigabyte. Handsets' flash memory storage has also increased, but still pales compared with the storage on a PC. Few mainstream handsets today have slots for removable memory cards. Disk drives are now found on a handful of mobile handsets, but are unlikely to appear on mainstream devices for a few years, due to price, size, and dramatic effect on battery life.

A handset's relatively small amount of memory affects the "slickness" of any mobile advertising, especially when combined with the small amount of data which can realistically be downloaded within one second across a wireless network. The result typically limits animations to one or two frames per second, vs. 20 frames per second on a PC. The almost complete lack of persistent memory further reduces the "slickness" of mobile advertising. The cache on a handset is severely restricted, thus few advertisements can be cached. This results in less relevancy for cacheable ads, and reloading ads increases network usage.

2.7 Network Cost

While many consumers pay a fixed monthly fee for PC and wireless bandwidth, the actual cost of delivering one kilobyte of data over a wireless network far exceeds the cost on the wired Web.

This is often the primary limitation to providing the best possible customer experience. Within the next three years, wireless' capabilities will increase dramatically:

Typical screen resolutions up to 320×480;
5-way navigation controls replaced by an analog joystick of similar size;
4G networks with lower latencies and higher throughput;
CPUs at least twice as fast as today;
RAM capacity for tens of seconds of animation frames;
Flash memory capacity for hours of video.

Despite all of these improvements, unless the cost per kilobyte of bandwidth drops dramatically, wireless carriers will be forced to limit the amount of data per page, and thus limit the customer experience. This is a hot topic today. While a text-only page might use only three-quarters of a kilobyte, a page with one small image can often be 4K of data or more. The bandwidth cost difference, over millions of pages and millions of subscribers, is significant.

3.0 Medio Systems Advertising Platform 3.1 Overview

Medio's solution will provide a mobile-centric, performance-based advertising system, complete with a web-based application for bidding on ad placement based on keywords, concepts, location, and customer profile. Advertising types will include text ads, banner ads, interstitial ads, paid placements, and pay-per-call.

This Advertising Platform includes three major components:

Web-based Advertising Management, Reporting & Analytics Toolkits
A web-based Advertiser Bidding System
An Advertisement Placement Engine/Optimizer 3.2 Advertising Management, Reporting & Analytics Toolkits The web-based Advertising Management Toolkit provides monitoring of search traffic and advertisement placement for Medio's wireless carrier partners.

In addition, this console includes an interface for "digging down" into the performance of any advertisement using analytics, generating reports, and exporting data into other analysis tools.

3.3 Advertiser Bidding System

Today, a blue hyperlinked ad title followed by two lines of text is sufficient for the experience on the PC-based web. However, mobile demands more creative, intuitive, and functional advertisements. For instance, how would users experience today's web ad inventory when most HTML sites are not viewable from a mainstream mobile device?

Medio's Bidding System will necessarily be both more feature-rich and complex than Google's AdWords (above), but will include similar functionality, providing a self-service set of tools for advertisers large and small.

3.4 Advertisement Placement Engine/Optimizer

The key Advertising Platform component, and by far the most complex, is the Advertisement Placement Engine. This component uses the rules and bids from the Bidding System to optimize the best advertisement for every search and information page delivered by Medio's servers.

Generally, the Advertisement Placement Engine uses this formula:

$$CTR*CPC*P(A)$$

Where CTR=Click Through Rate, CPC=Cost Per Click or Cost Per Thousand, and P(A) is a Predictive Analytic measure of whether a particular advertisement to be likely to be clicked, based on the search keywords and the subscriber's search and click-through history. This is one of the unique, patent-pending technologies that Medio has developed for mobile advertising that produces significantly increased revenue.

4.0 Types of Advertisements

Medio's Advertising Platform initially features four forms of advertisements:

Banner Ads
Interstitial Ads
Paid Placement
Pay-per-Call

Over time, subscribers and advertisers will eventually agree upon the most acceptable and effective forms of advertising, and Medio expects to add other forms as the market matures.

4.1 Banner Ads

Screen "real estate" is a much more precious commodity on mobile handsets than on the PC-based web. Whereas on a 15-inch monitor a 600×80-pixel banner is unobtrusive, that one image contains more pixels than entire screen on most popular handsets. Similarly, three or four banner advertisements, in a 200-pixel-wide column along the right side of a web page, are considered unobtrusive. In the mobile world, two columns are feasible only on the largest of smart phones.

Banner ads in Medio's Advertisement Platform can consist of text, images, or animations, depending on the markup language, the capabilities of the handset, and the advertiser's creative choice. Unlike Google's three-line text ads or PC-based banner ads, all of the above variants must be provided by the advertiser. Banner ads can be purchased on an impression or performance (click-through) basis.

4.2 Interstitial Ads

Network latency on wireless networks is a minimum of two seconds, and typically four to six seconds, while initial network access can take as long as 20 seconds. Many complex PC-based web pages (such as a GMail inbox) can take a similar amount of time to load. However, the expected latency on handheld devices is much lower than on a PC, making even two seconds feel like a long time to wait. This latency is an opportunity to present the most unobtrusive of advertisements, namely interstitial ads. Like banners, interstitials can use text, images, or animations. As with banners, the advertiser must provide variants for a range of handset capabilities.

To compensate for latency, an initial set of interstitial ads must be resident on the client, and the at least part of the Advertisement Placement Engine must also be resident on the handset. This enables the interstitial ad to essentially fill the time that the network and client require to display the next page. After the page is downloaded, the search system updates its cache of interstitial ads, adding those most relevant to the keywords or page. Interstitials are likely to be impression-based to start, but click-throughs can be performed and measured on an interstitial ad as well.

4.3 Paid Placement

Paid placement search results are an acceptable form of advertisement on the PC-based web. Similar paid placements will be possible in Mobile Search, although screen dimensions limit the number of paid placements that can be displayed prior to any algorithmic search results. Paid placement results can include yellow page listings, "featured" merchandise, or cross-promotions. Paid placements are always performance-based.

4.4 Pay-Per-Call

The pay-per-call model is fairly new on the PC-based web. Implementation of this model generally includes VoIP clients and/or special toll-free phone numbers that must be carefully tracked. This adds to the complexity of this model, and for this and other reasons, click-through ads which lead to a web site are much more popular than pay-per-call.

On mobile, the most intuitive action is to speak on the phone. Medio expects that a very common action upon selecting an advertisement is to dial a phone number. This also takes advantage of a significant limitation: most advertisers will not have a mobile-displayable website, and many may not have any website.

The pay-per-call model is ideal for local merchants. These businesses pay large sums of money to advertise in the Yellow Pages and in local newspapers. They understand the value of a customer calling their phone. These calls are valued in dollars, not pennies, and thus represent a significant, untapped opportunity.

Pay-per-call also works for national advertising campaigns. It is the flipside of telemarketing, enabling interested customers to call in instead of hiring vast pools of callers to make intrusive cold calls. It is far easier to close a sale over the phone than via a web site. Pay-per-call is always performance-based.

5.0 Types of Bidding

Medio's Advertising Platform includes an auction model for advertisement placement, allowing advertisers to bid on multiple placement types:

Keyword
Concept
Profile
Location

This goes beyond the simple keyword-based placement typically seen on the web. The follow subsections explain each of these placement types.

5.1 Keyword

This is the method commonly found on web search engines. An advertiser specifies a keyword, set of keywords or exact phrases, and the advertisements are displayed on search results related to those keywords, or on pages contextually related to those keywords.

5.2 Concept

Medio's Search System incorporates much more insight into the actual concept being searched. For example, when a subscriber searches for "Usher", the search results are grouped by concept, such as Ringtones, Wallpaper, Games, News, and more. Advertisers can place bids based on any of these concepts. Each of these concepts is composed of sub-concepts. For example, Ringtones may include Hip-Hop Ringtones or Truetone Ringtones.

Bidding for concept avoids the difficulties inherent in bidding for keywords, wherein an advertiser must research a set of keywords which match the target concept. It allows, for example, the automaker Jaguar to bid on the concept of "Automobiles" and avoid placement with results featuring jaguar cats.

5.3 Profile

Medio's Search System is fully personalized, analyzing the full search history of each customer and grouping customers into common profiles. For example, customers who generally search for ringtones can be organized into a "Ringer Buyers" profile, and customers who often read their horoscope can be organized into an "Astrology" profile. With the carrier's assistance, profiles for age, gender, and home town are also possible.

Profiles allow advertisers to target audiences, no matter what those customers happen to search in any day. In addition, profiles can be added to the other placement types to limit advertising placement to specific profiles, even in keyword-generated results.

5.4 Location

Medio's Search System is location-aware. Location may consist of little more than the last or most-frequently specified city for a weather forecast, or it can become as specific as the current cell tower identifier, or a GPS-derived location accurate to within a few meters. This provides local advertisers with the ability to participate in the mobile advertising market.

As mobile devices incorporate location technology, all carriers will eventually provide highly accurate location data, allowing for location-sensitive advertisements. For example, the nearest Starbucks can provide a special offer to subscribers who are within two blocks of the store, and different offers for subscribers more than one mile away.

Like profiles, location can be added to the other bidding systems to better target customers who are searching for specific types of content. This should greatly increase the relevancy, and thus the action-rate, of advertisements, resulting in higher average bids.

6.0 Advertisement Relevancy

A search engine with an integrated advertising platform has proven to be a key combination for delivering relevant advertisements that achieve results for advertisers. The same should hold true for mobile.

There are two methods for achieving relevancy. First, the keywords used in search queries help explicitly match a customer's intent with an advertisement. Second, when viewing news articles and other information sources, it is possible to perform an implicit, contextual search based on the contents of the page.

6.1 Explicit Search

Medio's Search System uses text-based search queries. A query is mapped to keywords and concepts culled from various searchable information sources, providing results relevant to the customer. Similarly, these keywords and concepts, combined with the location and profile of the customer, are used by the Medio Advertising Platform to match the most relevant advertisement to the search results.

For example, Callaway Golf can bid for the concept of "golf." If a customer searches for a golf celebrity, such as "tiger woods" or "annika sorenstam", or golf tournaments, such as "US Open" or "Masters", the search will automatically be associated with the concept of "golf" and the customer will receive search results including games, wallpaper, and news stories of the respective golf celebrity or tournament, along with the Callaway advertisement. Thanks to Medio's unique concept-based targeting, Callaway does not need to list all possible keyword combinations to appear in all golf-related results.

In another example, Nike can bid for the concept of "basketball," and for the profile of "Urban Music Listeners". If a customer who previously purchased a 50 Cent ringtone later searches for "raptors", the Nike ad appears, along with the latest Raptors information, such as game score.

6.2 Contextual Search

In addition to a text search box, Medio's Search System includes multiple forms of contextual search, such as the links presented in search results.

For example, a customer who searches for "pacman" finds a downloadable Pac-Man game. That page will also include recommendations for other games such as Asteroids. If the customer follows the Asteroids link, Medio's Search System knows that the page falls under the concept of "games" and that Asteroids is a "retro" game. Electronic Arts could bid for an ad under those concepts, or simply using the keyword "asteroids," to have its ad presented on that page, even though the customer never actually typed in that text.

Similarly, a customer searches for "cnn" and receives a list of top news stories from CNN. Following one link, he reads a news story. Medio's Search System will extract the keywords and concepts described in that news story, and present a relevant advertisement. Again, the customer did not type a specific keyword, but a relevant advertisement appears.

Addendum A. Medio Systems Advertising Platform

The Medio Systems Advertising Platform is a customized solution, provided by Medio Systems, that is tailored for Medio Systems customers, such as particular service providers.

A.1 The Goal

The goal of the Medio Systems Advertising Platform is to increase customer revenues by selling ad placements of various types across all the possible data services. This goal has been reached today on the PC-based Web, and Medio believes it should carry over to mobile handsets.

This document describes mobile banner, interstitial, paid-placement, and pay-per-call advertisements. These can be integrated into the existing WAP browsing experience, the WAP search experience, the "rich" search application, ultimately deep within the pages of the content providers' pages, and perhaps even into the downloadable games and videos.

A.2 Eyeballs First

It is generally not accepted practice in the industry to have advertisers ready to buy ad placements without sufficient related "eyeballs" to view those ads. Those eyeballs need to belong to recurring customers, and the initial experiences of those customers can not be compromised by an abundance of ads or the constant repetition of identical ads; the proper balance of advertisers and search inventory is necessary to maintain a healthy performance-based advertising ecosystem.

From today's web-based systems we know the advertising dollars of the first few tens of millions browsed pages and search results are of little value compared to more quickly building a search-based experience which leads toward hundreds of millions of searches per month. It is only this greater scale of searches, targeted accurately to the customers' interests, that will lead to large numbers of advertisers and hence will lead to competitive bids-all of which together will add substantial amounts of revenue.

A.3 Example Metrics

Advertising is all about the numbers. No matter the style of ad (i.e. banner, pay-per-call, etc.), advertisers demand large numbers of potential customers in order to justify placing an ad. Take the following example:

Advertiser A is willing to spend $0.10 per "click-through" to find 1000 customers.

A typical click-through rate for a successful ad is 1%.

Suppose on average 100,000 unique customers viewing 10 pages per day.

100,000 customers×5 pages/day=500,000 page views/day 500,000 page views×1%=5,000 click-throughs 5,000 click-throughs×$0.10=$500/day This example assumes every page view includes the advertisement. It in fact assumes every page view includes the same advertisement. Both of those assumptions are flawed. More reasonably, about 50% of the page views will have both a reasonable location to place an ad, and a relevant advertisement to be placed. Plus more reasonably, there will be thousands of advertisers, within only 50% of the advertisements having a successful click-through rate. These two additional factors drive down the expected revenue to as low as $125/day. At that rate, it's simply not worth the effort to deploy advertising, comparatively speaking.

The other assumption hiding in this example is that 500,000 page views have estimated worth of $500/day. If these 500,000 page views are split amongst 1,000 advertisers, then on average there are only 5,000 page views per advertiser per day. At a 1% click-through rate, that is only 50 click-throughs per day. For any large advertiser, that is not worth the effort to manage an advertising campaign.

A.4 Getting the Experience Right

Browsing via a WAP deck is a sub-optimal customer experience. Adding advertisements to that experience is not an improvement. Search, on the other hand, is expected to be a positive and effective customer experience. Adding advertisements to that experience before it is perfected will potentially jeopardize the entire mobile advertising business.

Returning to the previous example, but moving forward to many months from now when search is a common daily use on a mobile handset:

1,000,000 customers×2 searches/day=2,000,000 searches/day 5 page views/search*2,000,000 searches/day=10,000,000 page views/day 10,000,000 page views×1%=100,000 click-throughs 100,000 click-throughs×$0.10=$10,000/day This model does not suffer the same flawed assumptions as the previous model. These ad placements are based on explicit and contextual search, and thus each ad is as relevant as possible from the inventory.

The keys to this model are in increasing the average number of searches per customer per day and increasing the average number of page views per search. The former is maximized by providing a great customer experience across a wide number of search categories. The latter is increases by making that experience as "sticky" as possible to ensure more opportunities to present advertisements.

However, generally customers do not want to view advertisements, especially if they are "in the way" of the desired information or in any way slow down the experience. Thus, until mobile search is an ingrained habit, any use of advertising that degrades the customer experience may prevent that habit from forming, lower the number of customers using search, lower the average number of searches per day, and lower the average number of pages per search. Lowering any of those factors ultimately lessens the revenue opportunity from advertising.

A.5 Relevancy

Placing advertisements is a tightly coupled technology to search. They both have identical goals of displaying the most relevant information to the customer. Both use the search keywords (explicit or implied) from the page. Both can be improved using personalization. Both can be improved using analytic recommendations. For this reason, it makes sense to combine an advertising platform with a search engine. That has been proven multiple times on the PC-based Web. Google and Yahoo far exceed the advertisement placements and revenues of the next nearest competitors.

Relevancy also plays an important role in growing the advertising base. Via the search logs, it is possible to determine that X% of the customer base is searching for topic T. That information can be used to target vendors serving topic T. The actual metrics of number of searches, number of unique customers, etc. can be used to excite those vendors sufficiently to sign up with the service provider as advertisers. This targeted sales process avoids having large numbers of advertisers targeting unpopular topics, which would lead toward large numbers of unhappy advertisers. This is part of the virtuous cycle of search+advertising.

A.6 Conclusion

Medio Systems brings critically important Thought Leadership, Mobile Centric advertising approaches, Search expertise, new Advertiser Bidding Options, and wide-scale production experience to produce the world's leading mobile search and advertising services for mobile carriers.

Medio Systems Architecture

The exemplary embodiments described above in conjunction with the drawings of FIG. 1 through FIG. 8 can be implemented in an architecture that utilizes software installed client-side on the mobile devices and also installed server-side for performing the search function, supporting ad placement bidding, and for providing access to content. An example of one such implementation is illustrated in the architecture diagram of FIG. 9, in which the mobile device installed software is represented by the "Client" depiction, the search engine software is represented by the "Search Platform" depiction, the ad placement bidding software is represented by the "Advertising Platform" and "Ad Placement Optimizer" depiction, and the content access software is represented by the "Content Broker" depiction.

Figure 9:
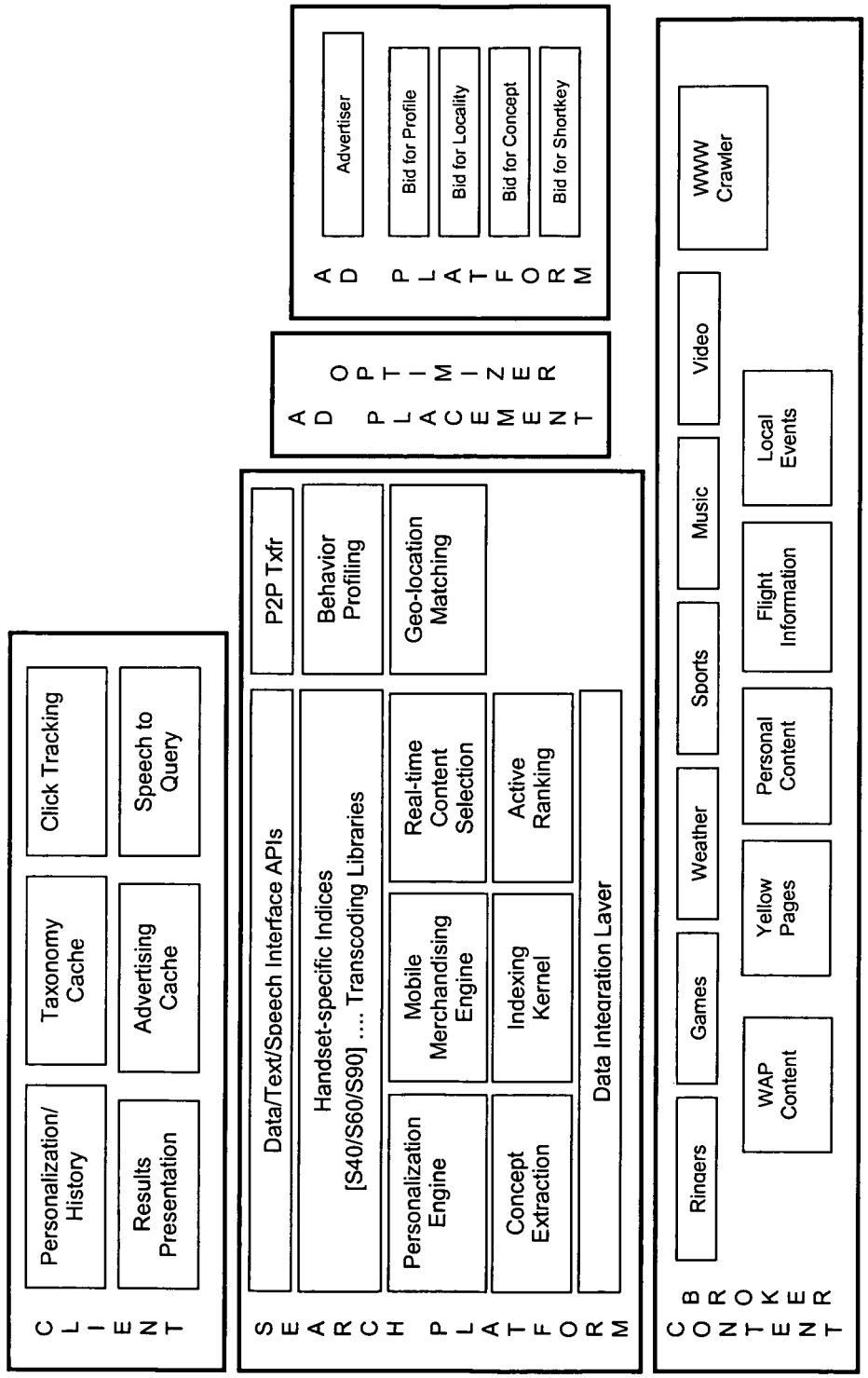
FIG. 9 is a block diagram of exemplary software architecture for the system illustrated in FIG. 1.

Thus, in the exemplary embodiment of FIG. 9, the client software includes procedures or modules to provide a personalization history with user preferences, a taxonomy cache, click tracking for the user, results presentation for rendering pages, an advertising cache for received advertiser pages, and a speech-to-query module, if desired.

Also in FIG. 9, the Search Platform is illustrated as having a variety of modules and functions. It should be understood that modules providing features and functions in addition to those necessary for the operation as described in accordance with the invention are optional. For example, device position location determination is not necessary to all embodiments described above, and therefore the "Geo-Location Matching" module depicted in FIG. 9 is optional.

In the CLIENT component:

a. The Personalization/History component stores the recent searches performed by the subscriber. This is used to tune the search experience within the handset without requiring an interaction with the server.

b. The Taxonomy Cache component stores the popular keywords, concepts, and categories. This is used by the Personalization/History component to further tune the search experience.

c. The Click Tracking component stores all the key presses and other forms of input with the handset-resident application. This information-is periodically passed down to the server and used as part of the analytic feedback methods which provide personalized and generalized improvements to the overall search system.

d. The Results Presentation component renders the search results and other information on the handset.

e. The Advertising Cache component stores interstitial images and other advertisements for display on the handset without requiring an interaction with the server.

f. The Speech to Query component performs all or part of the speech query recognition.

In the SEARCH PLATFORM component:

a. The Data/Text/Speech Interface APIs allow external clients and services to perform searches using the SEARCH PLATFORM. This component additionally contains the APIs which interface the Medio client with the Medio search server.

b. The P2P Txfr component encodes search results as SMS, MMS, WAP Push, IM, Email, and other messaging formats allowing sharing of search results between subscribers.
c. The Handset-specific Indices component stores information cross referenced by handset model. This component includes libraries which can optimize the presentation of the search results for each handset model including transcoding of image sizes and transcoding of web markup and other file formats for viewing on mobile handsets.
d. The Behavior Profiling component performs data mining and other analytic methods whose results are used to improve the search results and to personalize the search results for individual subscribers.
e. The Personalization Engine uses the analysis from the Behavior Profiling component, the data from the Click Tracking component in the Client, and other data provided by the carrier to personalize the search results for individual subscribers.
f. The Mobile Merchandising Engine component uses data mining and other analytic methods to produce recommendations of content related to the content found in the search results.
g. The Real-time Content Selection component integrates external databases of content within the search results.
h. The Geo-location Matching component uses the location of the subscriber initiating the search to filter the set of search indices used to perform the search as well as filtering the search results in order to make them more relevant to the specific location.
i. The Concept Extraction component disambiguates the search query, extracting the likely meanings of ambiguous search terms and parsing queries containing syntactic properties.
j. The Indexing Kernel component contains the core search index libraries, the core search crawler libraries, and assorted other libraries which form the basis of the search engine's ability to search.
k. The Active Ranking component re-orders the search results based on analyzed global and personalized usage history.
l. The Data Integration Layer component ties together the data analysis information, the search indices, and other data warehouse information.

The AD PLACEMENT OPTIMIZER component interfaces with a multitude of advertising inventory databases, e.g. Overture Network and Medio's own inventory, and places the advertisement which maximizes the advertising revenue opportunity.

The AD PLATFORM component integrates advertising inventory from a multitude of advertising networks, e.g. Overture Networks, plus it includes a performance based advertising bidding system with bidding based on customer profile, location, search concept, and search query shortkeys, as well as keywords.

The CONTENT BROKER component contains a set of highly tuned search engines plus the methods required to combine the results from all those search engines into a single page of results. The individual "searchlets" can be created for any type of digital content, including such examples as shown: ringtones, games, weather, sports scores, music downloads, video, web sites, WAP sites, Yellow Pages, content stored on subscribers' PCs, flight status, and local events.

The "Content Broker" block in FIG. 9 represents an application that manages access to, and download of, content from the network, such as the Internet or other content sources, including commercial sites where such content may be purchased. For example, such content may include Web sites that provide ringtones, games, weather, sports, music, and video. The Content Broker may utilize a Web crawler to obtain such information.

Figure 10:
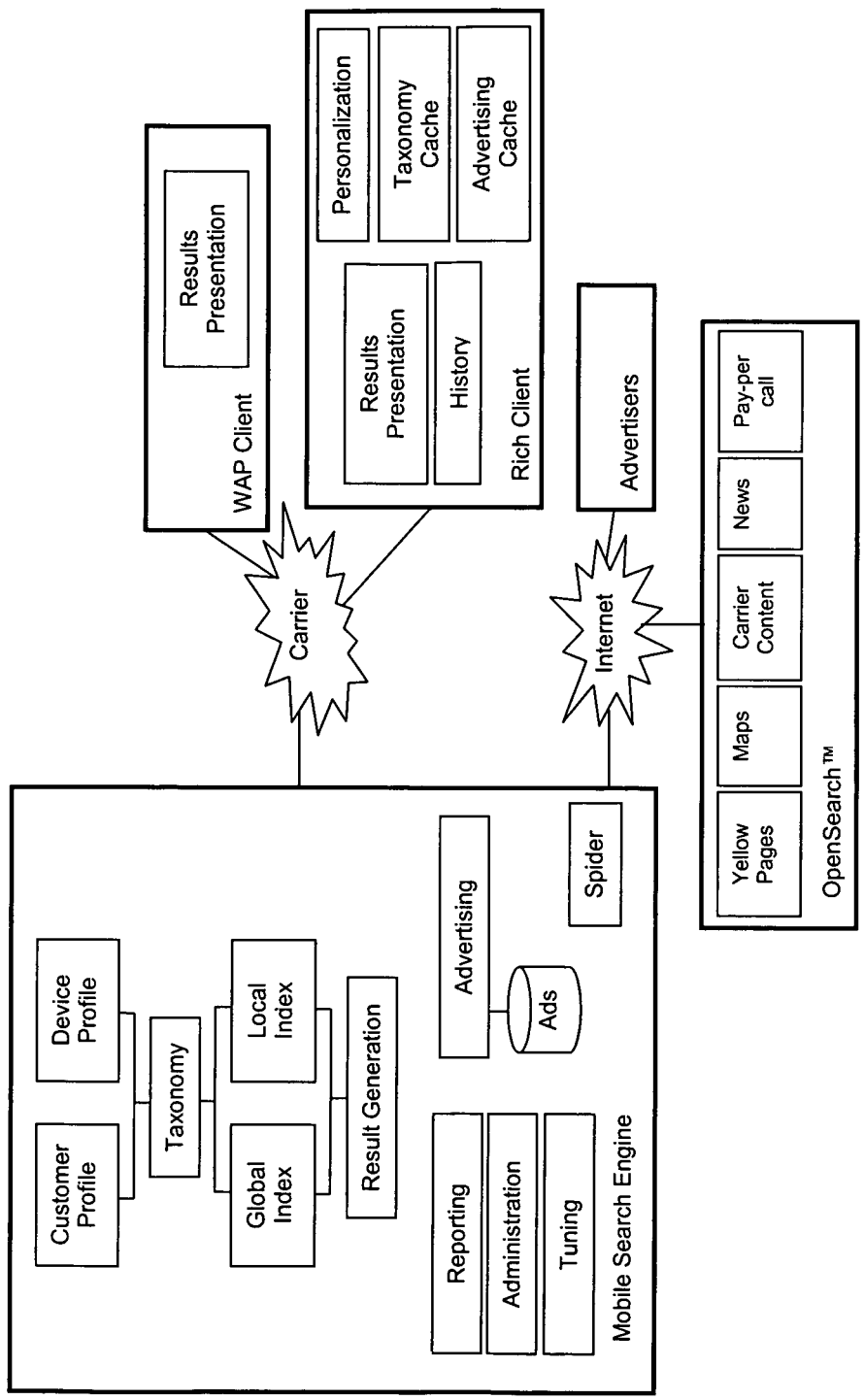
FIG. 10 illustrates an exemplary arrangement of components for a system constructed in accordance with the invention.

FIG. 10 illustrates an example of how the device clients, search engine, advertisers, and search facility (indicated as "OpenSearch" in FIG. 10) can be arranged in accordance with the invention. The device client, indicated in FIG. 10 as either a "Rich Client" or a "WAP client", communicates with the device carrier, through which the client (user) gains access to network content and to the Search Engine. The Search Engine, in turn, gains access to advertisers and to the OpenSearch facility through Internet communications.

The Search Engine component in FIG. 10 contains the methods for generating a search result, for generating reports on the use of the search engine, an interface for administrating the search engine, an interface for tuning the search engine and ranking subsystem, an advertisement placement engine, and a spider/crawler subsystem for creating the search index. Search results are personalized based on a customer profile, filtered based on the device profile, and the search is performed across both the global index of accessible content in addition to a local index of content resident on the handset or resident on the subscriber's home PC or personal network storage locker.

The WAP Client component contains only a results presentation component.

The Rich Client component contains a results presentation component, plus components to locally cache advertising, history, and search taxonomy.

The Advertisers box represents the set of advertisers who access the advertising bidding component of the Search Engine via the Internet in order to place bids for advertisement placements.

The OpenSearch™ component allows external service providers to create Searchlets whose results can be integrated into the search results generated internally within the Search Engine.

As noted above, the operations described as being performed by the system in accordance with the invention can be performed by a computer processing apparatus. In accordance with well-known techniques, such operations on a computer processing apparatus can be implemented by means of installing processing software onto the computer processing apparatus. This is typically achieved by means of a program product containing appropriate program instructions (software). For example, the program product may comprise optical media such as a data CD or DVD that contains appropriate software to cause the computer apparatus to perform the described operations when the software is installed or may comprise other signal bearing media including a data signal. Likewise, any software to be installed on any of the computing devices described herein can be achieved with such program product devices to install the appropriate software onto the device for execution:

Having fully described several embodiments of the present invention, other equivalent or alternative methods of practicing the present invention will be apparent to those skilled in the art. These and other embodiments as well as alternatives and equivalents to the described system will be recognizable to those of skill in the art after reading the description herein. The scope of the invention should not, therefore, be determined solely by reference to the above description, but instead should be determined with reference to the appended claims along with their full scope of equivalents and alternatives.

We claim:

1. A computer method of processing a search query result, the computer method comprising:

identifying a plurality of result pages in response to a search query submitted from a computing device that is associated with a subscriber, wherein the search query is directed to a collection of pages;

determining a relevancy ranking for each of the result pages in accordance with a parameter set that includes metrics relating to the search query itself and also includes metrics unique to the subscriber associated with the computing device, and includes metrics related to the computing device from which the search query was submitted, wherein each of the parameter set metrics, when applied to the result pages, provides a re-ordering of the result pages, wherein the parameter set metrics are applied according to a tunable priority received from an administrative console input, and the determined relevancy ranking comprises a single merged ordering of the respective re-orderings; and providing the result pages in accordance with the determined relevancy ranking;

wherein the administrative console input specifies parameter set processing for a plurality of ranking operations, and the administrative console input is used to select or deselect each of the ranking operations and specify an order of operation for the selected ranking operations, wherein determining a relevancy ranking includes:

associating each result page with a relevancy ranking value; and ordering the plurality of result pages in accordance with the associated relevancy ranking values of the result pages; and wherein the relevancy ranking value is adjusted with a tunable parameter value, and wherein the relevancy ranking value AR is calculated according to $$\forall_u \; AR_k(u) = c \begin{bmatrix} \alpha \sum_i \left( tf_i * \log\left(\frac{D}{df}\right)\right) + \\ \beta \sum_{v \in \cup u} P(v) + \\ \lambda \sum_{v \in \cup u} DSI(v) + \\ \gamma \left(1 - \sqrt{(u_x - P(V_x))^2 + (u_y - P(V_y))^2}\right) \end{bmatrix} + (1 - c)$$

where the terms are defined by the following:

AR=Active Rank matrix (sorted order of vectors)
u=set of total search results
v=set of metadata attributes associated with each search result item
k=a given Active Rank row (value for a specific search result)
c=normalization coefficient≤1
α=bias to weight keyword matching effects (0≤α≤1)
β=bias to weight Personalization profiles (0≤β≤1)
λ=bias to weight Device Specificity effects (0≤λ≤1)
γ=bias to weight LBS geometric distance effects (0≤γ≤1)
$tf_i$=term frequency (keyword counts) or number of times a term i occurs in a search result page
$df_i$=document frequency or number of pages in the search result pages containing term i
D=number of documents in the database
P=Personalization profile vector
DSI=Device Specific Index vector
$(u_x, u_y)$=each search result's geocoded location, if any
$(v_x, v_y)$=cellular user's actual physical location (stored in vector P) provided by the cellular network.

2. A computer method as defined claim 1, wherein the search query metrics for determining the relevancy ranking include data relating to aggregate popularity of keywords contained in the search query.

3. A computer method as defined in claim 1, wherein the metrics related to the computing device includes rendering capabilities of the computing device.

4. A computer method as defined in claim 3, wherein the rendering capabilities of the computing device relate to display screen resolution.

5. A computer method as defined in claim 3, wherein the rendering capabilities of the computing device relate to audio playback features.

6. A computer method as defined in claim 3, wherein the rendering capabilities of the computing device relate to network bandwidth.

7. A computer method as defined in claim 1, wherein the metrics related to the computing device includes geographic location of the computing device.

8. A computer method as defined in claim 1, wherein determining a relevancy ranking includes deleting a result page if the determined relevancy ranking of the result page is below a deletion value.

9. A computer method as defined in claim 1, wherein associating each result page is performed for each of the multiple parameter set metrics, and ordering the plurality of result pages comprises resolving respective relevancy rankings of each of the parameter set metrics.

10. A computer method as defined in claim 9, wherein the multiple dimension parameter set includes metrics relating to the search query itself, to the subscriber associated with the search query, to capabilities of the computing device, and to geographic location of the computing device.

11. A computer method as in claim 1, wherein bias values are received from the administrative console and include a bias value relating to the search query itself, a bias value relating to the subscriber metrics, a bias value relating to the computing device, and a bias value relating to location of the computing device upon sending the search query, such that the received bias values adjust the corresponding parameter set metrics.

12. A computer method as in claim 1, wherein the parameter set metrics include at least two from among the set of query keywords, popularity, subscriber, personalization, device, device-specific, location, and location-specific metrics.

13. A computer system that processes a search query result, the computer system comprising:

a network interface for communicating with a network through which access to a collection of pages is obtained, a processor that identifies a plurality of result pages in response to a search query submitted from a computing device that is associated with a subscriber, wherein the search query is directed to the collection of pages, determines a relevancy ranking for each of the result pages in accordance with a parameter set that includes metrics relating to the search query itself and also includes metrics unique to the subscriber associated with the computing device, and includes metrics related to the computing device from which the search query was submitted, wherein each of the parameter set metrics, when applied to the result pages, provides a re-ordering of the result pages, wherein the parameter set metrics are applied according to a tunable priority received from an administrative console input, and the determined relevancy ranking comprises a single merged ordering of the respective re-orderings and provides result pages in accordance with the determined relevancy ranking;

wherein the administrative console input specifies parameter set processing for a plurality of ranking operations, and the administrative console input is used to select or deselect each of the ranking operations and specify an order of operation for the selected ranking operations, wherein determining a relevancy ranking includes:

associating each result page with a relevancy ranking value; and ordering the plurality of result pages in accordance with the associated relevancy ranking values of the result pages; and wherein the relevancy ranking value is adjusted with a tunable parameter value, and wherein the relevancy ranking value AR is calculated according to $$\forall_u AR_k(u) = c \begin{bmatrix} \alpha \sum_i \left(tf_i * \log\left(\frac{D}{df}\right)\right) + \\ \beta \sum_{v \in \cup u} P(v) + \\ \lambda \sum_{v \in \cup u} DSI(v) + \\ \gamma \left(1 - \sqrt{(u_x - P(V_x))^2 + (u_y - P(V_y))^2}\right) \end{bmatrix} + (1-c)$$

where the terms are defined by the following:
AR=Active Rank matrix (sorted order of vectors)
u=set of total search results
v=set of metadata attributes associated with each search result item
k=a given Active Rank row (value for a specific search result)
c=normalization coefficient $\leq 1$
$\alpha$=bias to weight keyword matching effects ($0 \leq \alpha \leq 1$)
$\beta$=bias to weight Personalization profiles ($0 \leq \beta \leq 1$)
$\lambda$=bias to weight Device Specificity effects ($0 \leq \lambda \leq 1$)
$\gamma$=bias to weight LBS geometric distance effects ($0 \leq \gamma \leq 1$)
$tf_i$=term frequency (keyword counts) or number of times a term i occurs in a search result page
$df_i$=document frequency or number of pages in the search result pages containing term i
D=number of documents in the database
P=Personalization profile vector
DSI=Device Specific Index vector
$(u_x, u_y)$=each search result's geocoded location, if any
$(v_x, v_y)$=cellular user's actual physical location (stored in vector P) provided by the cellular network.

14. A computer system as defined claim 13, wherein the search query metrics for determining the relevancy ranking include data relating to aggregate popularity of keywords contained in the search query.

15. A computer system as defined claim 13, wherein the metrics related to the computing device includes rendering capabilities of the computing device.

16. A computer system as defined in claim 15, wherein the rendering capabilities of the computing device relate to display screen resolution.

17. A computer system as defined in claim 15, wherein the rendering capabilities of the computing device relate to audio playback features.

18. A computer system as defined in claim 15, wherein the rendering capabilities of the computing device relate to network bandwidth.

19. A computer system as defined in claim 13, wherein the metrics related to the computing device includes geographic location of the computing device.

20. A computer system as defined in claim 13, wherein determining a relevancy ranking includes deleting a result page if the determined relevancy ranking of the result page is below a deletion value.

21. A computer system as defined in claims 13, wherein associating each result page is performed for each of the multiple parameter set metrics, and ordering the plurality of result pages comprises resolving respective relevancy rankings of each of the parameter set metrics.

22. A computer system as defined in claim 13, wherein the multiple dimension parameter set includes metrics relating to the search query itself, to the subscriber associated with the search query, to capabilities of the computing device, and to geographic location of the computing device.

23. A computer system as defined claim 13, wherein bias values are received from the administrative console and include a bias value relating to the search query itself, a bias value relating to the subscriber metrics, a bias value relating to the computing device, and a bias value relating to location of the computing device upon sending the search query, such that the received bias values adjust the corresponding parameter set metrics.

24. A computer system as defined in claim 13, wherein the parameter set metrics include at least two from among the set of query keywords, popularity, subscriber, personalization, device, device-specific, location, and location-specific metrics.

25. A computer program product for use in a computer system that executes program steps recorded in a non-transitory computer-readable media to perform a method for processing a search query result, the program product comprising:

a non-transitory recordable media:
a program of computer-readable instructions recorded in the media and executable by the computer system to perform operations comprising:

identifying a plurality of result pages in response to a search query submitted from a computing device that is associated with a subscriber, wherein the search query is directed to a collection of pages;

determining a relevancy ranking for each of the result pages in accordance with a parameter set that includes metrics relating to the search query itself and also includes metrics unique to the subscriber associated with the computing device, and includes metrics related to the computing device from which the search query was submitted, wherein each of the parameter set metrics, when applied to the result pages, provides a re-ordering of the result pages, wherein the parameter set metrics are applied according to a tunable priority received from an administrative console input, and the determined relevancy ranking comprises a single merged ordering of the respective re-orderings; and providing the result pages in accordance with t determined relevancy ranking;

wherein the administrative console input specifies parameter set processing for a plurality of ranking operations, and the administrative console input is used to select or deselect each of the ranking operations and specify an order of operation for the selected ranking operations, wherein determining a relevancy ranking includes:
  associating each result page with a relevancy ranking value; and
  ordering the plurality of result pages in accordance with the associated relevancy ranking values of the result pa yes: and
wherein the relevancy ranking value is adjusted with a tunable parameter value,
wherein the relevancy ranking value AR is calculated according to $$\forall_u AR_k(u) = c \begin{bmatrix} \alpha \sum_i \left(tf_i * \log\left(\frac{D}{df}\right)\right) + \\ \beta \sum_{v \in \cup u} P(v) + \\ \lambda \sum_{v \in \cup u} DSI(v) + \\ \gamma\left(1 - \sqrt{(u_x - P(V_x))^2 + (u_y - P(V_y))^2}\right) \end{bmatrix} + (1 - c)$$

where the terms are defined by the following:
  AR=Active Rank matrix (sorted order of vectors)
  u=set of total search results
  v=set of metadata attributes associated with each search result item
  k=a given Active Rank row (value for a specific search result)
  c=normalization coefficient $\leq 1$
  $\alpha$=bias to weight keyword matching effects ($0 \leq \alpha \leq 1$)
  $\beta$=bias to weight Personalization profiles ($0 \leq \beta \leq 1$)
  $\lambda$=bias to weight Device Specificity effects ($0 \leq \lambda \leq 1$)
  $\gamma$=bias to weight LBS geometric distance effects ($0 \leq \gamma \leq 1$)
  $tf_i$=term frequency (keyword counts) or number of times a term i occurs in a search result page
  $df_i$=document frequency or number of pages in the search result pages containing term i
  D=number of documents in the database
  P=Personalization profile vector
  DSI=Device Specific Index vector
  $(u_x, u_y)$=each search result's geocoded location, if any
  $(v_x, v_y)$=cellular user's actual physical location (stored in vector P) provided by the cellular network.

26. A program product as defined claim 25, wherein the search query metrics for determining the relevancy ranking include data relating to aggregate popularity of keywords contained in the search query.

27. A program product as defined in claim 25, wherein the metrics related to the computing device includes rendering capabilities of the computing device.

28. A program product as defined in claim 27, wherein the rendering capabilities of the computing device relate to display screen resolution.

29. A program product as defined in claim 27, wherein the rendering capabilities of the computing device relate to audio playback features.

30. A program product as defined in claim 27, wherein the rendering capabilities of the computing device relate to network bandwidth.

31. A program product as defined in claim 25, wherein the metrics related to the computing device includes geographic location of the computing device.

32. A program product as defined in claim 25, wherein associating each result page is performed for each of the multiple parameter set metrics, and ordering the plurality of result pages comprises resolving respective relevancy rankings of each of the parameter set metrics.

33. A computer program product as defined in claim 32, wherein the multiple dimension parameter set includes metrics relating to the search query itself, to the subscriber associated with the search query, to capabilities of the computing device, and to geographic location of the computing device.

34. A program product as defined in claim 25, wherein bias values are received from the administrative console and include a bias value relating to the search query itself, a bias value relating to the subscriber metrics, a bias value relating to the computing device, and a bias value relating to location of the computing device upon sending the search query, such that the received bias values adjust the corresponding parameter set metrics.

35. A program product as defined in claim 25, wherein the parameter set metrics include at least two dimensions selected from among the set of query keywords, popularity, subscriber, personalization, device, device-specific, location, and location-specific metrics.

36. A program product as defined in claim 25, wherein determining a relevancy ranking includes deleting a result page if the determined relevancy ranking of the result page is below a deletion value.

* * * * *